(12) United States Patent
Imamura et al.

(10) Patent No.: US 6,493,074 B1
(45) Date of Patent: Dec. 10, 2002

(54) METHOD AND APPARATUS FOR MEASURING AN OPTICAL TRANSFER CHARACTERISTIC

(75) Inventors: Motoki Imamura, Tokyo (JP); Shiro Ryu, Tokyo (JP)

(73) Assignees: Advantest Corporation, Tokyo (JP); KDD Corporation, Tokyo (JP)

( * ) Notice: Subject to any disclaimer, the term of this patent is extended or adjusted under 35 U.S.C. 154(b) by 0 days.

(21) Appl. No.: 09/479,454

(22) Filed: Jan. 6, 2000

(30) Foreign Application Priority Data

Jan. 6, 1999 (JP) .......................................... 11-000989

(51) Int. Cl.[7] .......................... G01B 9/00; G01N 21/00; G01J 5/08
(52) U.S. Cl. ............... 356/124.5; 356/73.1; 250/227.18
(58) Field of Search .......................... 356/124.5, 73.1, 356/239.1, 239.2, 432, 433, 477, 484, 321, 300, 302; 250/227.15–227.27, 227; 359/642, 124, 191; 324/76.41, 96, 753

(56) References Cited

U.S. PATENT DOCUMENTS

| 3,644,015 A | * 2/1972 | Hearn ........................ 359/286 |
| 5,424,831 A | 6/1995 | Kossat et al. |
| 5,436,746 A | 7/1995 | Hirst |

FOREIGN PATENT DOCUMENTS

| EP | 0608611 | 8/1994 |
| EP | 0632433 | 1/1995 |
| EP | 0859435 | 8/1998 |

* cited by examiner

Primary Examiner—Frank G. Font
Assistant Examiner—Gordon Stock
(74) Attorney, Agent, or Firm—David N. Lathrop, Esq.; Gallagher & Lathrop (57) ABSTRACT

There are provided an optical transfer characteristic measuring method and apparatus capable of measuring an optical transfer characteristic of an optical device on optical frequency axis in wide optical frequency bandwidth with high resolution. There are provided a variable wavelength sweep type light source capable of switching the wavelength of an optical signal generated therefrom stepwise and sweeping the optical frequency of the optical signal in a predetermined frequency range, and a variable wavelength reference light source capable of switching the wavelength of an optical signal generated therefrom stepwise and not capable of sweeping the optical frequency of the optical signal. Optical signals having their wavelengths sequentially switched to corresponding specified wavelengths are generated from the variable wavelength sweep type light source, and also a sweep of the optical frequency of each optical signal having the corresponding specified wavelength is carried out over the predetermined frequency range, until the number of occurrences of the optical signals reaches a preset number of times. After the measurement of the optical transfer characteristic has been completed, the measured results of the optical transfer characteristic regarding all of the specified wavelengths are concatenated on optical frequency axis, and is analyzed/displayed.

12 Claims, 5 Drawing Sheets

METHOD AND APPARATUS FOR MEASURING AN OPTICAL TRANSFER CHARACTERISTIC

BACKGROUND OF THE INVENTION

1. Field of the Invention

The present invention relates to a method and an apparatus for measuring an optical transfer characteristic, each of which is capable of measuring an optical transfer characteristic of an optical device in a wide optical frequency bandwidth with high resolution, on optical frequency axis or on optical wavelength axis.

2. Description of the Related Art

Figure 4:
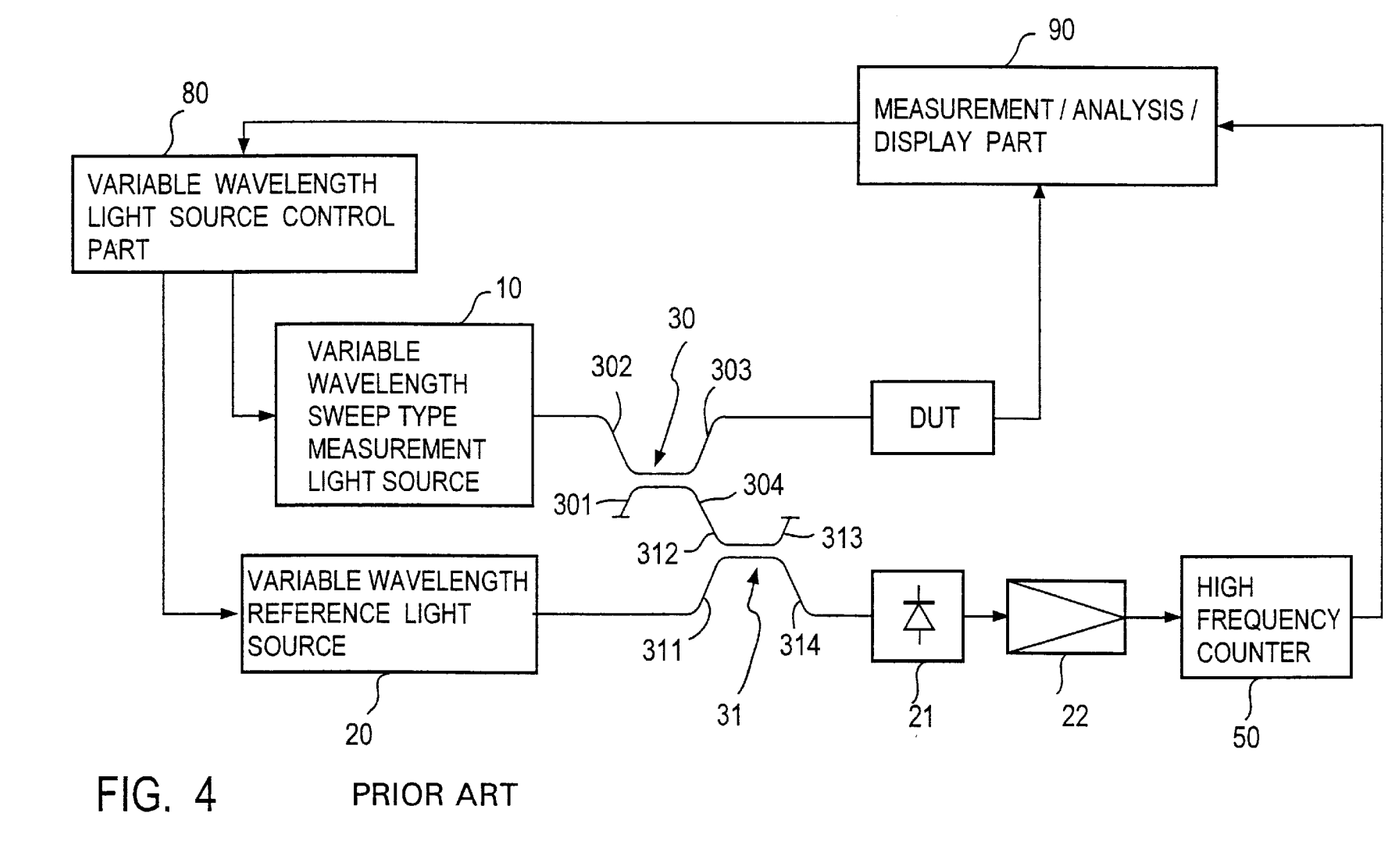
FIG. 4 is a block diagram showing an example of the optical transfer characteristic measuring apparatus used in case of measuring an optical transfer characteristic of an optical device.

In case of measuring an optical transfer characteristic (characteristic of amplitude, dispersion, delay, phase, gain or the like) of an optical device such as an optical filter, an optical fiber, an optical transmission system or the like, there is currently used an apparatus for measuring an optical transfer characteristic (an optical transfer characteristic measuring apparatus) having been constructed, for example, as shown in FIG. 4. The optical transfer characteristic measuring apparatus includes two light sources one of which is a variable wavelength sweep type light source 10 for measurement (hereinafter referred to as variable wavelength sweep type measurement light source or measurement light source), and the other of which is a variable wavelength light source 20 for reference (hereinafter referred to as variable wavelength reference light source or reference light source). In the variable wavelength sweep type measurement light source 10, the wavelength of an optical or light signal generated thereby can be switched stepwise and also the optical frequency of the optical signal can be swept in a predetermined frequency range. In the variable wavelength reference light source 20, the wavelength of an optical or light signal generated thereby can be switched stepwise, but the optical frequency of the optical signal cannot be swept.

An output end of the variable wavelength sweep type measurement light source 10 is optically coupled to an input end of an optical device whose optical transfer characteristic is to be measured (optical device under measurement) DUT via a first optical coupler 30. In the illustrated example, the first optical coupler 30 has four ports, i.e., the first through the fourth ports 301, 302, 303 and 304. The first and the second ports 301 and 302 are used as input ports, respectively, and the third and the fourth ports 303 and 304 are used as output ports, respectively. The first port (the first input port) 301 is terminated in reflectionless termination, the second port (the second input port) 302 is coupled to the output end of the variable wavelength sweep type measurement light source 10 via an optical fiber, the third port (the first output port) 303 is coupled to an input end of the optical device under test DUT via an optical fiber, and the fourth port (the second output port) 304 is coupled to the second port of a second optical coupler 31 which will be discussed later. As a result, an optical signal generated from the measurement light source 10 is optically branched into two, one of which is supplied to the input end of the optical device under measurement DUT and the other of which is supplied to the second port of the second optical coupler 31.

The output end of the variable wavelength reference light source 20 is coupled to the second optical coupler 31 via an optical fiber. The second optical coupler 31 also has four ports, i.e., the first through the fourth ports 311, 312, 313 and 314. The first and the second ports 311 and 312 are used as input ports, respectively, and the third and the fourth ports 313 and 314 are used as output ports, respectively. The first port (the first input port) 311 is coupled to the output end of the variable wavelength reference light source 20 via an optical fiber, the second port (the second input port) 312 is coupled to the second output port 304 of the first optical coupler 30 as mentioned above, the third port (the first output port) 313 is terminated in reflectionless termination, and the fourth port (the second output port) 314 is coupled to an input end of a light receiving device 21 via an optical fiber. As a result, an optical signal generated from the reference light source 20 is inputted to the second optical coupler 31 via its first input port 311, and also an optical signal generated from the measurement light source 10 is inputted to the second optical coupler 31 via its second input port 312, so that the two light signals can be optically heterodyned.

Since the illustrated optical transfer characteristic measuring apparatus monitors the amount of frequency sweep (a frequency being swept) using an optical heterodyne detection, the optical signals generated from the variable wavelength sweep type measurement light source 10 and the variable wavelength reference light source 20 are first set to signals having the same frequency (the same reference wavelength), and then the frequency of the optical signal generated from the measurement light source 10 is swept within a predetermined frequency range so that both the optical signals are optically heterodyned in the second optical coupler 31. After that, an electrical signal having a frequency difference between both the optical signals, i.e., an electrical signal having an optical beat frequency is detected by the light receiving device 21 coupled to the second output port 314 of the second optical coupler 31.

As the light receiving device 21 is used, in this example, a photodetector for converting light into an electrical signal such as a photodiode, and the electrical signal having the optical beat frequency detected by the light receiving device 21 is supplied to a high frequency counter 50 after it has been amplified by an amplifier 22. Further, the light receiving device 21 and the amplifier 22 constitute a wide-band or broad-band optical receiver 29.

The high frequency counter 50 measures, based on the electrical signal having the optical beat frequency supplied from the wide-band optical receiver 29, the amount of sweep of the frequency of the optical signal generated from the variable wavelength sweep type measurement light source 10, and supplies the measured result to a measurement/analysis/display part 90. On the other hand, an optical or light signal for measurement (hereinafter referred to as optical measurement signal) inputted to the optical device under measurement DUT via the first optical coupler 30 is transmitted through the optical device under measurement DUT into the measurement/analysis/display part 90. The measurement/analysis/display part 90 carries out a measurement/analysis of the inputted optical signal, and displays the results of the measurement/analysis, if necessary. In addition, the measurement/analysis/display part 90 supplies a control signal to a variable wavelength light source control part 80, as the case may be.

Control terminals of the measurement light source 10 and the reference light source 20 are connected to output terminals of the variable wavelength light source control part 80, respectively, and the reference wavelengths of both the optical signals generated respectively from these light sources 10 and 20 are determined on the basis of wavelength setting signals supplied from the variable wavelength light source control part 80 to the control terminals of both the light sources, respectively. In addition, the variable wavelength light source control part 80 supplies a frequency sweep instruction or command signal to the control terminal of the variable wavelength sweep type measurement light source 10 at a predetermined timing, thereby to cause the frequency of the optical signal generated from the measurement light source 10 to be swept within the predetermined frequency range.

Incidentally, an optical frequency bandwidth that can be covered by one sweep is determined by the performance of the variable wavelength sweep type measurement light source 10, and this bandwidth is approximately several 10 GHz or so in the current technology level. Accordingly, the wavelength of the optical signal generated from the measurement light source 10 will be changed, by sweep of the frequency, from a set reference wavelength which is the minimum (or the maximum) wavelength within the sweep wavelength range corresponding to the optical frequency bandwidth of the several 10 GHz or so, until the maximum (or the minimum) wavelength within that sweep wavelength range.

The optical transfer characteristic of the optical device under measurement DUT is first measured at the set reference wavelength of an optical measurement signal generated from the variable wavelength sweep type measurement light source 10, and next the frequency of the optical measurement signal of the measurement light source 10 is swept within the optical frequency bandwidth of several 10 GHz or so, so that the optical transfer characteristic of the optical device under measurement DUT can be measured at the set reference wavelength as well as at each of measurement points subsequent to the set reference wavelength spaced a constant distance or interval apart, which are determined by the resolution of the measuring apparatus (in other words, at each of optical frequencies corresponding to these measurement points). Therefore, the variable wavelength sweep type measurement light source 10 can perform its sweep operation with sufficiently high resolution in respect of that optical frequency bandwidth of several 10 GHz or so.

Further, as the variable wavelength reference light source 20, it is preferable to use a high precision light source which is capable of generating an optical signal having more precisely controlled reference wavelength as compared with the reference wavelength of the optical measurement signal generated from the variable wavelength sweep type measurement light source 10.

Figure 5:
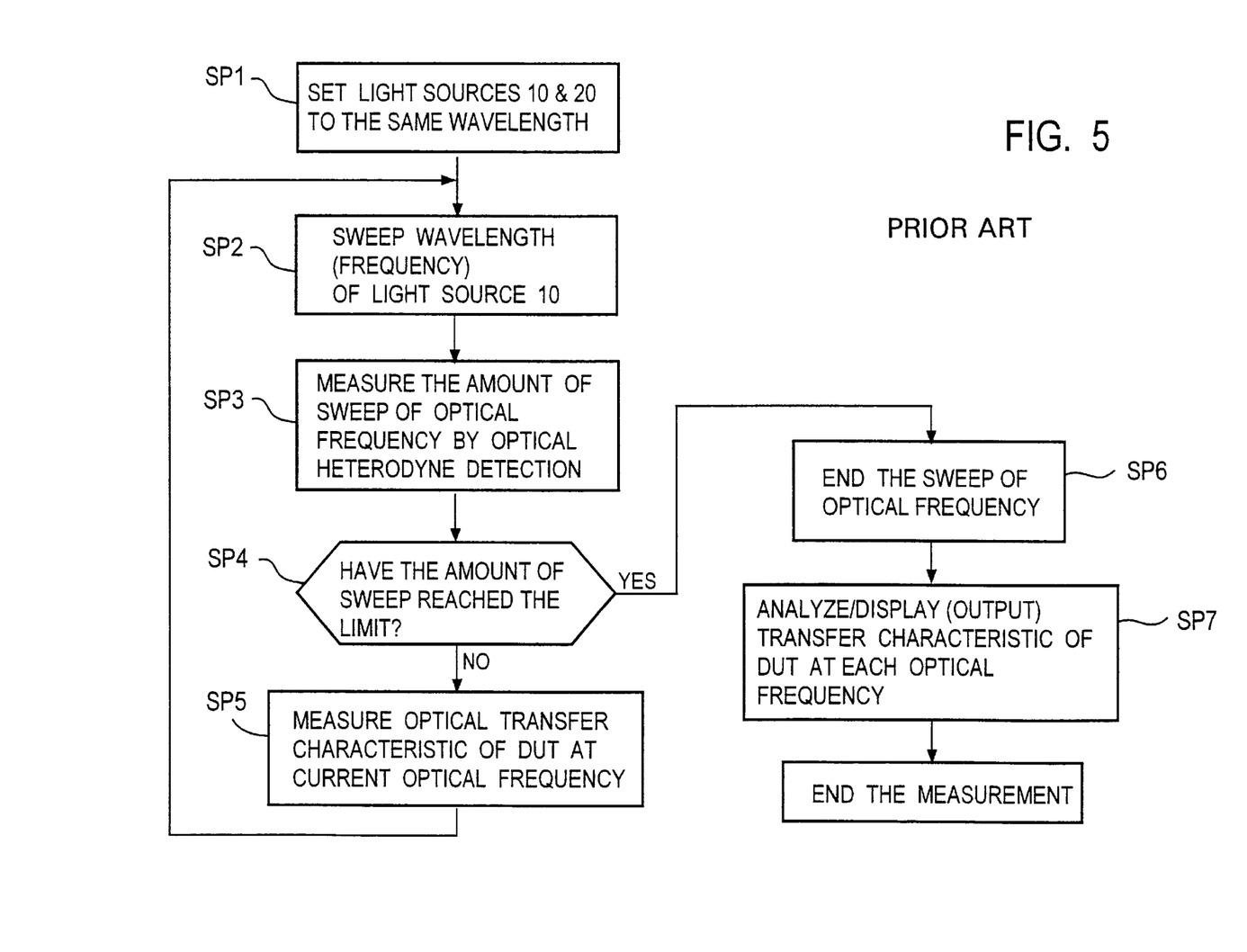
FIG. 5 is a flow chart for explaining the operation of the optical transfer characteristic measuring apparatus shown in FIG. 4.

The operation of the optical transfer characteristic measuring apparatus constructed as mentioned above will be described with reference to a flow chart shown in FIG. 5.

First, in step SP1, a wavelength setting signal is supplied to both of the light sources 10 and 20 from the variable wavelength light source control part 80, thereby to set the wavelengths of the optical signals to be generated respectively from these light sources 10 and 20 to a specified identical reference wavelength, for example, $\lambda_0$ so that optical signals each having this reference wavelength $\lambda_0$ are outputted from both light sources.

The optical signal of the reference wavelength $\lambda_0$ generated from the variable wavelength sweep type measurement light source 10 is inputted to the optical device under measurement DUT and the second optical coupler 31 via the first optical coupler 30. The optical signal inputted to the optical device under measurement DUT is transmitted through this optical device under measurement DUT to the measurement/analysis/display part 90 so that an optical transfer characteristic of the optical device under measurement DUT is measured. On the other hand, the optical signal inputted to the second optical coupler 31 does not optically interfere with the optical signal generated from the variable wavelength reference light source 20 because the wavelength of the optical signal inputted to the second optical coupler 31 is the same, at this point in time, as the wavelength $\lambda_0$ of the optical signal outputted from the variable wavelength reference light source 20. As a result, the difference frequency between both the optical signals is zero, and hence no detected output is generated from the wide-band optical receiver 29. Accordingly, the amount of sweep on the optical signal outputted from the high frequency counter 50 is zero.

Next, the process proceeds to step SP2 in which the variable wavelength light source control part 80 supplies a frequency sweep instruction signal to the variable wavelength sweep type measurement light source 10, thereby to sweep the frequency of the optical signal outputted from the variable wavelength sweep type measurement light source 10 within a predetermined frequency range (optical frequency bandwidth of several 10 GHz or so).

When the sweep of the optical frequency is started, a detected output is outputted from the wide-band optical receiver 29. Accordingly, in step SP3, the detected output from the wide-band optical receiver 29 is measured by the high frequency counter 50. Based on the measured result, the measurement/analysis/display part 90 measures the amount of sweep of the optical frequency. Next, in step SP4, a decision is rendered whether the amount of sweep of the optical frequency has reached a limit of the ending side of sweep or not, that is, whether the frequency of the optical signal has been swept up to the upper limit (or the lower limit) of the predetermined frequency range or not.

During the time period that the amount of sweep of the optical frequency has not reached that limit (during the time period that the decision indicates "NO"), in step SP5, the optical transfer characteristic of the optical device under measurement DUT is measured at each of measurement points spaced a constant distance or interval apart starting at the set reference wavelength $\lambda_0$ (measured at each of optical frequencies corresponding to these measuring points), the constant distance being determined by the resolution of the measuring apparatus. The measurement at each of the measuring points is performed by repeating the steps SP2, SP3, SP4 and SP5.

On the contrary, in the step SP4, when the amount of sweep of the optical frequency has reached the limit of the ending side of sweep (YES), the process proceeds to step SP6 in which the sweep of the optical frequency of the optical signal having the reference wavelength $\lambda_0$ generated from the variable wavelength sweep type measurement light source 10 has been ended.

Next, the process proceeds to step SP7 in which the measurement/analysis/display part 90 analyzes the optical transfer characteristics of the optical device under measurement DUT at the reference wavelength $\lambda_0$ as well as at the measurement points (at each of the optical frequencies) ranging from the reference wavelength $\lambda_0$ to the upper limit or the lower limit within the predetermined frequency range, and displays or outputs the results of the measurement/analysis, if necessary. By this process, the measurement of the optical transfer characteristic of the optical device under measurement DUT has been completed.

As mentioned above, in the optical transfer characteristic measuring apparatus and method currently used, there are prepared, in order to measure the optical transfer characteristics of the optical device under measurement with high resolution on optical frequency axis or on optical wavelength axis, two types of light sources, one being the variable wavelength sweep type measurement light source 10 and the other being the variable wavelength reference light source 20, and the optical transfer characteristics of the optical device under measurement are measured while the sweep frequency on the optical measurement signal generated from the variable wavelength sweep type measurement light source 10 is being monitored by use of the optical heterodyne detection in which the optical signal generated from the variable wavelength reference light source 20 is used as a reference light.

However, the frequency bandwidth of the variable wavelength sweep type measurement light source 10 that can be covered by one frequency sweep is that of several 10 GHz or so, and hence there is a limitation in the sweep frequency bandwidth. Since a measurable optical frequency bandwidth is determined by this limitation in the sweep frequency bandwidth, the current optical transfer characteristic measuring apparatus and method cannot measure an optical transfer characteristic in wide optical frequency bandwidth with high resolution.

That is, as discussed above, the sweep frequency bandwidth of the optical signal generated from the variable wavelength sweep type measurement light source 10 is a bandwidth of only several 10 GHz or so. On the contrary, an operating frequency bandwidth of an optical device used in, for example, optical communications is much wider than the frequency bandwidth of several 10 GHz or so. Accordingly, there is a serious drawback that if an optical transfer characteristic of such optical device is measured by one frequency sweep of the variable wavelength sweep type measurement light source 10 and the optical transfer characteristic thereof is evaluated, the measured and evaluated results are unreliable. In other words, it is desirable to measure an optical transfer characteristic of an optical device on optical frequency axis or on optical wavelength axis in a wide sweep frequency bandwidth comparable to the wide frequency bandwidth of the optical device.

Moreover, in the technology of wavelength division multiplexing transmission (WDM) in recent years, there is a tendency that a distance between wavelengths is becoming more and more narrow. Therefore, the resolution on optical frequency axis must sufficiently be ensured. In addition, in case of performing a computation or operation such as a differential or the like and/or an analysis on the optical frequency axis, if the sweep frequency bandwidth is narrow, the amount of data in one time operation or computation (frequency bandwidth) determined at the time of the operation becomes discontinuous in the starting area or the ending area of the optical frequency axis. As a result, an operation or computation process error (measurement error) occurs in the starting area or the ending area of the optical frequency axis.

SUMMARY OF THE INVENTION

It is an object of the present invention to provide a method for measuring an optical transfer characteristic which is capable of measuring an optical transfer characteristic of an optical device on optical frequency axis or on optical wavelength axis in wide optical frequency bandwidth with high resolution.

It is another object of the present invention to provide an apparatus for measuring an optical transfer characteristic which uses the aforesaid optical transfer characteristic measuring method.

In order to accomplish the above objects, in a first aspect of the present invention, there is provided a method of measuring an optical transfer characteristic comprising the steps of: sequentially shifting an optical frequency band such that any discontinuous point in frequency does not occur, performing a sweep of an optical frequency over each of the respective optical frequency bands, and measuring an optical transfer characteristic of an optical device under measurement a plurality of times; and concatenating the measured data of the plurality of times on optical frequency axis.

The optical frequency bands sequentially shifted have an overlapped portion between two adjacent optical frequency bands, the overlapped portion being composed of a frequency band portion in the sweep ending side of one optical frequency band which is swept earlier in time and a frequency band portion in the sweep starting side of the other optical frequency band which is swept next time.

In a preferred embodiment, the sweep of the other optical frequency band which is swept next time is started at an optical frequency in the proximity of the sweep ending side of the one optical frequency band which is swept earlier in time.

In a second aspect of the present invention, there is provided a method of measuring an optical transfer characteristic comprising the steps of: (A) generating an optical signal having a specified first wavelength from a variable wavelength sweep type light source which is capable of switching stepwise the wavelength of an optical signal generated thereby and sweeping the optical frequency of the optical signal in a predetermined frequency range; (B) measuring an optical transfer characteristic of an optical device under measurement at the specified first wavelength; (C) sweeping the optical frequency of the optical signal having the specified first wavelength; (D) measuring the optical transfer characteristic of the optical device under measurement at each of the respective wavelengths corresponding to a predetermined plurality of optical frequencies during the sweep of the optical frequency of the optical signal; (E) ending the sweep of the optical frequency of the optical signal when the sweep optical frequency of the optical signal has reached a frequency corresponding to a specified second wavelength to be generated next time from said variable wavelength sweep type light source; (F) measuring the optical transfer characteristic of the optical device under measurement at the specified second wavelength to be generated next time; (G) sweeping the optical frequency of the optical signal having the specified second wavelength; (H) measuring the optical transfer characteristic of the optical device under measurement at each of the respective wavelengths corresponding to a predetermined plurality of optical frequencies during the sweep of the optical frequency of the optical signal; (I) ending the sweep of the optical frequency of the optical signal when the sweep optical frequency of the optical signal has reached a frequency corresponding to a specified third wavelength to be generated next time from said variable wavelength sweep type light source; (J) repeating the steps (F) to (I) with regard to each of specified wavelengths to be generated from the variable wavelength sweep type light source until the specified wavelengths to be generated therefrom have been completed; and (K) concatenating, on optical frequency axis or optical wavelength axis, the measured results of the optical transfer characteristic regarding all of the specified wavelengths generated from the variable wavelength sweep type light source.

A distance between the plurality of specified wavelengths generated from the variable wavelength sweep type light source and switched stepwise is chosen such that it is shorter than a distance corresponding to the sweep frequency bandwidth of the optical signal.

In a preferred embodiment, by sweep of the optical frequency of the optical signal, a wavelength range is swept, which starts at a predetermined wavelength in the side of a specified wavelength generated earlier in time than the associated specified wavelength, and extends therefrom through this associated specified wavelength to a specified wavelength generated next time.

By sweep of the optical frequency of the optical signal, a wavelength range may be swept, which starts at the associated specified wavelength, and extends therefrom through a specified wavelength generated next time to a predetermined wavelength beyond this next generated specified wavelength.

Alternatively, by sweep of the optical frequency of the optical signal, a wavelength range may be swept, which starts at a predetermined wavelength in the side of a specified wavelength generated earlier in time than the associated specified wavelength, and extends therefrom through this associated specified wavelength and a specified wavelength generated next time to a predetermined wavelength beyond this next generated specified wavelength.

The amount of sweep of the optical frequency of the optical signal is monitored by an optical heterodyne detection of an optical signal generated from the variable wavelength sweep type light source.

In a third aspect of the present invention, there is provided an apparatus for measuring an optical transfer characteristic comprising: a variable wavelength sweep type light source capable of switching stepwise the wavelength of an optical signal generated thereby and sweeping the optical frequency of the optical signal in a predetermined frequency range; light source control means for setting the wavelength of an optical signal generated from said variable wavelength sweep type light source to a specified wavelength as well as causing a sweep of the optical frequency of the generated optical signal having the specified wavelength over said predetermined frequency range to be carried out; first optical coupling means for inputting the optical signal generated from the variable wavelength sweep type light source into an optical device under measurement; measuring means optically coupled to said optical device under measurement for receiving an optical signal outputted from the optical device under measurement to measure an optical transfer characteristic of the optical device under measurement; counting means for counting the number of occurrence times of optical signals generated from the variable wavelength sweep type light source, the wavelength of each of said optical signals having been set to a specified wavelength; and means for ending the measurement of the optical transfer characteristic of the optical device under measurement, in response to a count signal outputted from said counting means when the number of occurrence times of optical signals each having a set specified wavelength has reached a preset number of times; and wherein said light source control means causing the variable wavelength sweep type light source to generate optical signals having their wavelengths sequentially switched and set to corresponding specified wavelengths as well as causing a sweep of the optical frequency of each of the generated optical signals having the corresponding specified wavelengths over said predetermined frequency range to be carried out, until the number of occurrence times of the optical signals each having a set specified wavelength reaches the preset number of times; and said measuring means concatenating, on optical frequency axis or optical wavelength axis, the measured results of the optical transfer characteristic regarding all of the specified wavelengths after the measurement of the optical transfer characteristic has been completed, and analyzing/displaying it.

In a preferred embodiment, the measuring apparatus further comprises: a variable wavelength reference light source capable of switching stepwise the wavelength of an optical signal generated thereby and incapable of sweeping the optical frequency of the optical signal; second optical coupling means into which are inputted an optical signal generated from said variable wavelength reference light source and an optical signal generated from said variable wavelength sweep type light source, and outputting an optical signal which has been optically heterodyned; and optical detecting means for detecting the optical signal outputted from said second optical coupling means to detect an electrical signal having an optical beat frequency; and wherein the wavelength of an optical signal generated from said variable wavelength reference light source is set to the same wavelength as the specified wavelength of an optical signal generated from the variable wavelength sweep type light source by the light source control means; said second optical coupling means optically heterodynes an optical signal of a specified wavelength generated from the variable wavelength reference light source and an optical signal. the wavelength of which is varied by a sweep of the optical frequency thereof, generated from the variable wavelength sweep type light source, and inputs the heterodyned optical signal into said optical detecting means; and the amount of sweep of the optical frequency is monitored on the basis of the electrical signal having an optical beat frequency detected by said optical detecting means.

In addition, the second optical coupling means optically heterodynes the optical signal generated from the variable wavelength sweep type light source and optically branched by the first optical coupling means, and the optical signal generated from the variable wavelength reference light source, and inputs the heterodyned optical signal into the optical detecting means.

Moreover, the measuring apparatus further includes: high frequency counting means for measuring the amount of sweep of the optical frequency on the basis of a detected output from the optical detecting means, and supplying the measured result to said measuring means; frequency-to-voltage converting means for converting a detected output from the optical detecting means into a voltage signal; a memory in which wavelength switching data are previously stored, the number of the wavelength switching data being equal to the number of specified wavelengths of optical signals generated from the variable wavelength sweep type light source, and the specified wavelengths being switched in one measurement; and voltage comparing means for comparing a voltage signal outputted from said frequency-to-voltage converting means with data read out of said memory; and wherein said counting means counts the number of occurrence times of optical signals generated from the variable wavelength sweep type light source, the wavelength of each of the optical signals having been set to a specified wavelength, by counting comparison result signals outputted from the voltage comparing means.

DETAILED DESCRIPTION OF THE PREFERRED EMBODIMENTS

Figure 2:
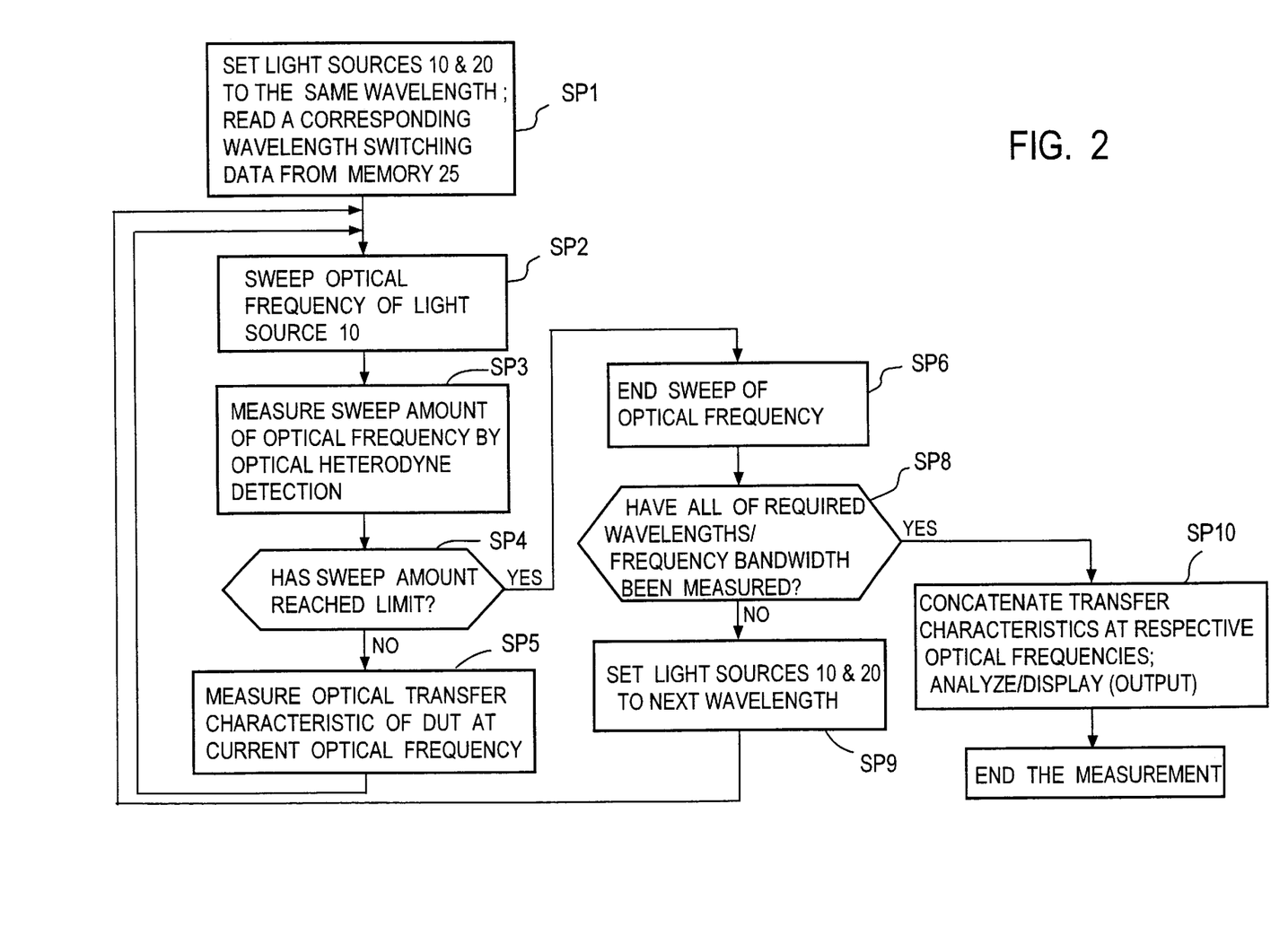
FIG. 2 is a flow chart for explaining the operation of the optical transfer characteristic measuring apparatus shown in FIG. 1.
Figure 3A:
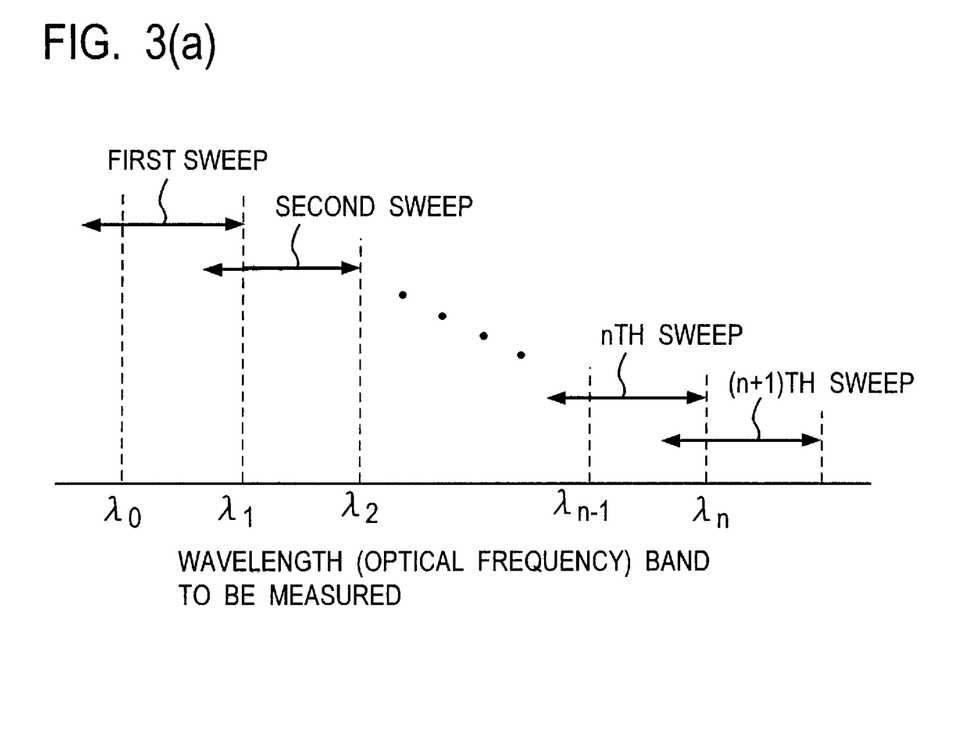
FIG. 3(a) shows a diagram for explaining a frequency sweep operation used in the optical transfer characteristic measuring apparatus and method according to the present invention.

Now the present invention will be described with respect to the preferred embodiments of the optical transfer characteristic measuring apparatus and method according to the present invention in detail with reference to FIGS. 1 to 3. Further, portions and/or elements in FIG. 1 corresponding to those in FIG. 4 will be shown by the same reference characters affixed thereto, and the explanation thereof will be omitted unless it is necessary.

Figure 1:
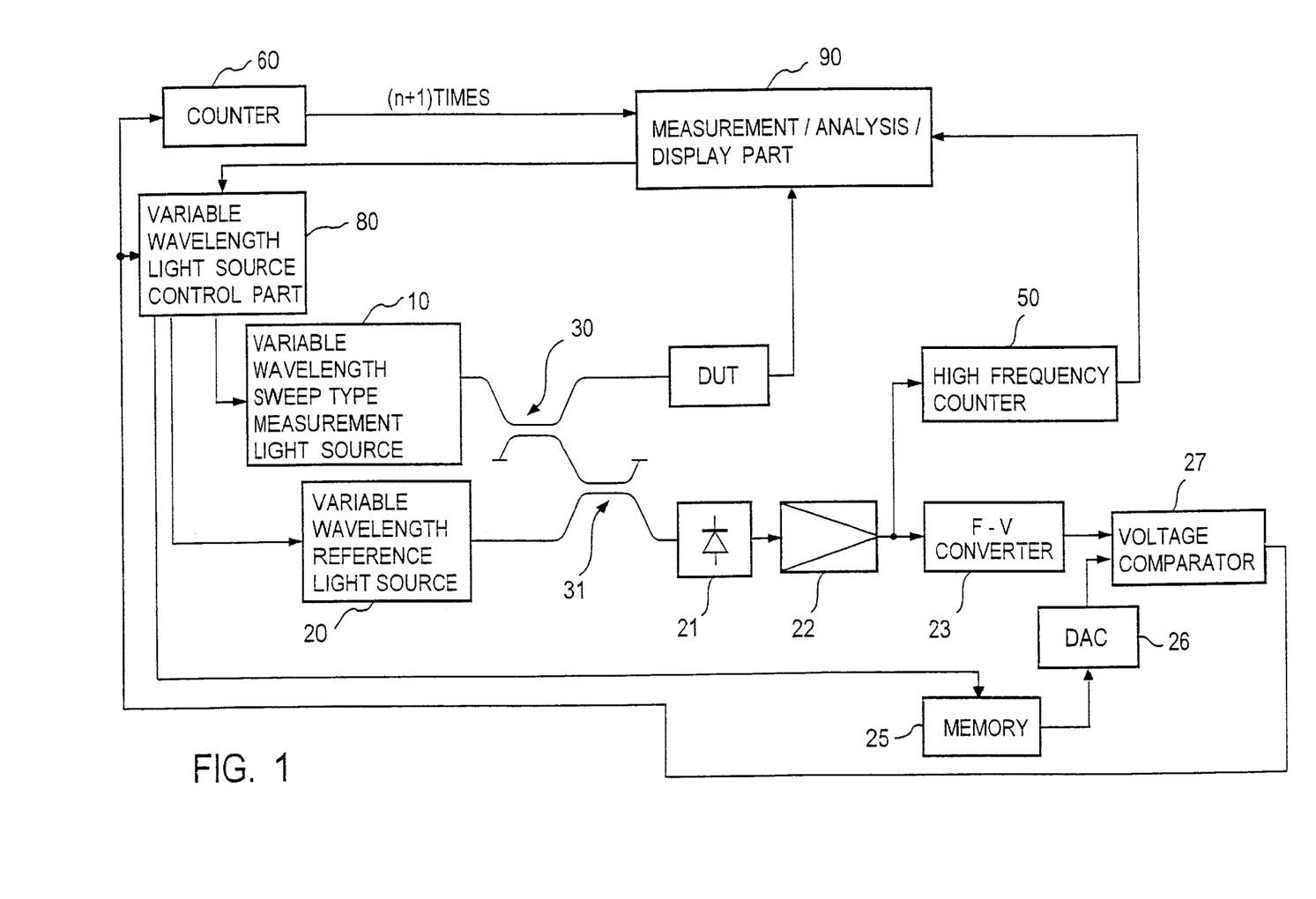
FIG. 1 is a block diagram showing an embodiment of the optical transfer characteristic measuring apparatus according to the present invention.

FIG. 1 is a block diagram showing, in outline, the construction of one preferred embodiment of the optical transfer characteristic measuring apparatus according to the present invention. Similar to the optical transfer characteristic measuring apparatus shown in FIG. 4, the optical transfer characteristic measuring apparatus in this embodiment also includes two light sources one of which is a variable wavelength sweep type light source 10 for measurement (hereinafter referred to as variable wavelength sweep type measurement light source or measurement light source), and the other of which is a variable wavelength light source 20 for reference (hereinafter referred to as variable wavelength reference light source or reference light source). In the variable wavelength sweep type measurement light source 10, the wavelength of an optical or light signal generated thereby can be switched stepwise and also the optical frequency of the optical signal can be swept in a predetermined frequency range. In the variable wavelength reference light source 20, the wavelength of an optical or light signal generated thereby can be switched stepwise, but the optical frequency of the optical signal cannot be swept.

Control terminals of these light sources 10 and 20 are connected to output terminals of the variable wavelength light source control part 80, respectively, and the reference wavelengths of both the optical signals generated respectively from these light sources 10 and 20 are determined by wavelength setting signals supplied from the variable wavelength light source control part 80 to the control terminals. In addition, the variable wavelength light source control part 80 supplies a frequency sweep instruction or command signal to the control terminal of the variable wavelength sweep type measurement light source 10 at a predetermined timing, thereby to cause the frequency of the optical signal generated from the measurement light source 10 to be swept within the predetermined frequency range. Further, as the variable wavelength reference light source 20, it is preferable to use a high precision light source which is capable of generating an optical signal having more precisely controlled reference wavelength as compared with the reference wavelength of the optical measurement signal generated from the variable wavelength sweep type measurement light source 10.

An output end of the variable wavelength sweep type measurement light source 10 is optically coupled to an input end of an optical device whose optical transfer characteristic is to be measured (optical device under measurement) DUT via a first optical coupler 30, and an output end of the variable wavelength reference light source 20 is coupled to a second optical coupler 31 via an optical fiber.

Two light signals, one being an optical reference signal generated from the reference light source 20 and the other being an optical measurement signal generated from the measurement light source 10, are inputted to the second optical coupler 31 so that these two light signals are optically heterodyned in the second optical coupler 31. The optically heterodyned light signal is inputted to a light receiving device 21 which is a photodetector for converting light into an electrical signal such as a photodiode, and it is detected as an electrical signal having a frequency difference between both the optical signals, i.e., an electrical signal having an optical beat frequency by the light receiving device 21.

The electrical signal of optical beat frequency detected by the light receiving device 21 is supplied to a high frequency counter 50 after it has been amplified by an amplifier 22. The high frequency counter 50 measures the amount of sweep of the frequency of the optical signal generated from the variable wavelength sweep type measurement light source 10, and supplies the measured result to a measurement/analysis/display part 90. On the other hand, an optical measurement signal inputted to the optical device under measurement DUT via the first optical coupler 30 is transmitted through this optical device under measurement DUT into the measurement/analysis/display part 90. The measurement/analysis/display part 90 carries out a measurement/analysis of the inputted optical signal, and displays, if necessary, the results of the measurement/analysis. In addition, the measurement/analysis/display part 90 supplies a control signal to a variable wavelength light source control part 80, as the case may be.

In the present invention, an output signal of the amplifier 22 for amplifying the electrical signal of optical beat frequency detected by the light receiving device 21 is also supplied to a frequency-to-voltage converter (F-V converter) 23, thereby to convert the electrical signal of optical beat frequency into a voltage signal which is, in turn, supplied to one input terminal of a voltage comparator 27. In addition, there are provided a memory 25 in which wavelength switching data are previously stored, the number of the wavelength switching data being equal to the number of wavelengths of optical signals generated from the variable wavelength sweep type measurement light source 10, and the wavelengths being switched in one measurement, and a digital-to-analog converter (DAC) 26 for converting the wavelength switching data read out from the memory 25 into an analog signal. The analog signal outputted from this digital-to-analog converter (hereinafter referred to as DAC) 26 is supplied to the other input terminal of the voltage comparator 27.

For example, if the number of wavelengths of an optical signal generated from the measurement light source 10 switched stepwise in one measurement is n+1 (n is an integer equal to or greater than 1) of $\lambda_0, \lambda_1, \lambda_2, \ldots, \lambda_{(n-1)}, \lambda_n$, then wavelength switching data the number of which is n+1 are stored in advance in the memory 25. Each of these switching data may be, for instance, a digital data corresponding to a predetermined voltage value of one voltage signal among voltage signals outputted from the frequency-to-voltage converter (hereinafter referred to as F-V converter) 23 during the sweep of frequency for each of the set wavelengths $\lambda_0, \lambda_1, \lambda_2, \ldots, \lambda_{(n-1)}, \lambda_n$. For example, it may be preferable that a digital data corresponding to a voltage value outputted from the F-V converter 23 in the proximity of the limit in the ending side of the frequency sweep is stored in the memory 25.

Here, it is assumed that among the wavelengths of an optical signal generated from the variable wavelength sweep type measurement light source 10, the wavelength $\lambda_0$ is the minimum wavelength and the wavelength $\lambda_n$ is the maximum wavelength. In addition, it is preferable that a distance between two adjacent wavelengths (between $\lambda_0$ and $\lambda_1$, between $\lambda_1$ and $\lambda_2$, between $\lambda_2$ and $\lambda_3$, ..., between $\lambda_{(n-1)}$ and $\lambda_n$) is so chosen that it is somewhat shorter than a wavelength distance corresponding to the sweep frequency bandwidth (a bandwidth of several 10 GHz or so) of an optical signal outputted from the variable wavelength sweep type measurement light source 10.

The voltage comparator 27 compares the electrical signal (voltage signal) of optical beat frequency supplied from the F-V converter 23 with the voltage signal supplied from the DAC 26. When both the voltage signals coincide with each other, the voltage comparator 27 outputs a coincidence detection signal. As the coincidence detection signal, for example, a signal of logical "1" or logical "0" may be used. The coincidence detection signal outputted from the voltage comparator 27 is supplied to both the variable wavelength light source control part 80 and a output-times counter 60 for counting the number of occurrence times of the coincidence detection signal.

Upon receiving the coincidence detection signal from the voltage comparator 27, the variable wavelength light source control part 80 supplies next wavelength setting signals to both the light sources 10 and 20. In addition, the variable wavelength light source control part 80 supplies a read instruction to the memory 25, thereby to read out next wavelength switching data from the memory 25.

On the other hand, the output-times counter 60 counts the number of received coincidence detection signals, and supplies the counted result thereof to the measurement/analysis/display part 90 as the number of monitor times. The measurement/analysis/display part 90 applies a control signal to the variable wavelength light source control part 80 when the number of monitor times from the output-times counter 60 becomes n+1. The variable wavelength light source control part 80 stops, upon receiving the control signal, supplying of the wavelength setting signals as well as stops the operations of both the light sources 10 and 20. As a result, the real measurement of an optical transfer characteristic has been completed. The measurement/analysis/display part 90 concatenates the measured results of n+1 times on optical frequency axis or on optical wavelength axis and analyzes the optical transfer characteristic of the optical device under measurement, and displays it, if necessary.

In this manner, the optical transfer characteristic measuring apparatus according to the present invention shown in FIG. 1 is capable of measuring an optical transfer characteristic of an optical device under measurement on optical frequency axis or on optical wavelength axis and in a wide optical frequency bandwidth with high resolution by automatically controlling the variable wavelength sweep type measurement light source 10 and the variable wavelength reference light source 20, and by automatically and sequentially switching wavelengths of optical signals outputted from the respective light sources.

The operation of the optical transfer characteristic measuring apparatus according to the present invention constructed as discussed above will be described in more detail with reference to the flow chart shown in FIG. 2. Further, steps in FIG. 2 which are substantially the same as those in FIG. 5 will be shown by the same reference characters affixed thereto.

First, in step SP1, wavelength setting signals are supplied to both the light sources 10 and 20 respectively from the variable wavelength light source control part 80 to set the wavelengths of optical signals to be generated respectively from both the light sources to a specified identical reference wavelength, for example, $\lambda_0$ which is the minimum reference wavelength, thereby to generate the optical signals each having this reference wavelength $\lambda_0$ from both the light sources, respectively. At the same time, a data read-out instruction or command is supplied to the memory 25, thereby to read out a wavelength switching data corresponding to the reference wavelength $\lambda_0$ from the memory 25, and the wavelength switching data is supplied to the DAC 26.

The optical signal of the reference wavelength $\lambda_0$ generated from the variable wavelength sweep type measurement light source 10 is inputted into both of the optical device under measurement DUT and the second optical coupler 31 via the first optical coupler 30. The optical signal inputted into the optical device under measurement DUT is transmitted through this optical device under measurement DUT into the measurement/analysis/display part 90, in which an optical transfer characteristic of the optical device under measurement DUT is measured. On the other hand, the optical signal inputted to the second optical coupler 31 does not optically interfere with the optical signal generated from the variable wavelength reference light source 20 since the wavelength $\lambda_0$ of the optical signal inputted to the second optical coupler 31 is the same as the wavelength $\lambda_0$ of the optical signal outputted from the variable wavelength reference light source 20 at this time point. As a result, the difference frequency between both the optical signals is zero, and hence no detection output is generated from the photodetector 21. Consequently, the amount of frequency sweep on the optical signal outputted from the high frequency counter 50 is zero. Moreover, since no voltage signal is outputted from the F-V converter 23, the voltage comparator 27 does not generate any coincidence detection signal.

Next, the process proceeds to step SP2 in which a frequency sweep instruction signal is supplied from the variable wavelength light source control part 80 to the variable wavelength sweep type measurement light source 10 so that the frequency of the optical signal outputted from the variable wavelength sweep type measurement light source 10 is swept in the predetermined frequency range (optical frequency bandwidth of several 10 GHz or so). By this frequency sweep, the wavelength of the optical signal outputted from the variable wavelength sweep type measurement light source 10 is changed from the reference wavelength $\lambda_0$ to the next reference wavelength $\lambda_1$.

In this embodiment, a distance between two adjacent reference wavelengths (between $\lambda_0$ and $\lambda_1$, between $\lambda_1$ and $\lambda_2$, between $\lambda_2$ and $\lambda_3$, ..., between $\lambda_{(n-1)}$ and $\lambda_n$) is so chosen that it is somewhat shorter than a wavelength distance corresponding to the sweep frequency bandwidth (a bandwidth of several 10 GHz or so) of the optical signal outputted from the variable wavelength sweep type measurement light source 10, and yet, the sweep frequency bandwidth is set such that by one sweep of the frequency, the wavelength of the optical signal is changed from a wavelength somewhat shorter than the set reference wavelength (for example, $\lambda_0$) to the next reference wavelength (for example, $\lambda_1$). Explaining with reference to FIG. 3, in this embodiment, as shown in FIG. 3(*a*), each of the sweep frequency bandwidths is set such that the sweep of the frequency is started at a wavelength somewhat shorter than the corresponding one of the set reference wavelengths ($\lambda_0$, $\lambda_1$, $\lambda_2$, . . . , $\lambda_{(n-1)}$, $\lambda_n$), and that by one sweep of the frequency, the wavelength of the optical signal is changed from this somewhat shorter wavelength through the corresponding set reference wavelength until the next reference wavelength. Accordingly, in each of the second and the following measurements, the frequency sweep is executed such that a predetermined band in the starting side of the sweep frequency band is overlapped with a predetermined band in the ending side of the preceding sweep frequency band. As a result, when the respective measured results are concatenated, any discontinuous portion does not occur at all at any concatenated point between two adjacent sweep frequency bands.

Alternatively, it goes without saying that each of the sweep frequency bandwidths may be set such that by one sweep of the frequency, the wavelength of the optical signal is changed from corresponding one (for example, $\lambda_0$) of the set reference wavelengths through the next reference wavelength (for example, $\lambda_1$) until a wavelength somewhat longer than this next reference wavelength ($\lambda_1$) or each of the sweep frequency bandwidths may be set such that by one sweep of the frequency, the wavelength of the optical signal is changed from a wavelength somewhat shorter than corresponding one of the set reference wavelengths through this corresponding set reference wavelength and the next reference wavelength until a wavelength somewhat longer than this next reference wavelength.

In case that the wavelength is stepwise switched toward shorter wavelength conversely to the above embodiment, the setting of the sweep frequency bandwidth discussed above is also applied to such case. Of course, a distance between two adjacent reference wavelengths may be chosen such that it is substantially equal to a wavelength distance corresponding to the sweep frequency bandwidth (bandwidth of several 10 GHz or so) of the optical signal generated from the variable wavelength sweep type measurement light source 10.

When the frequency sweep is started, a detected output is generated from the light receiving device 21. Therefore, in step SP3, the detected output from the light receiving device 21 is measured by the high frequency counter 50. Based on the measured result, the measurement/analysis/display part 90 measures the amount of sweep of the optical frequency. Next, in step SP4, a decision is rendered whether the amount of sweep of the optical frequency has reached a limit of the ending side of sweep or not, that is, whether the frequency of the optical signal has been changed until the lower limit of the predetermined frequency range or not.

During the time period that the amount of sweep of the optical frequency has not reached that limit (during the time period that the decision indicates "NO"), in step SP5, the optical transfer characteristic of the optical device under measurement DUT is measured at each of measurement points (each of optical frequencies) spaced a constant distance (or interval) apart starting at the set reference wavelength $\lambda_0$, the constant distance being determined by the resolution of the measuring apparatus. The measurement at each of the measuring points is performed by repeating the steps SP2, SP3, SP4 and SP5.

On the contrary, in the step SP4, when the amount of sweep of the optical frequency has reached the limit of the ending side of sweep (YES), the process proceeds to step SP6 in which the sweep of the optical frequency of the optical signal having the reference wavelength $\lambda_0$ generated from the variable wavelength sweep type measurement light source 10 has been ended. On the other hand, the voltage comparator 27 outputs a coincidence detection signal which is supplied to both the variable wavelength light source control part 80 and the output-times counter 60.

Next, in step SP8, a decision is rendered whether or not the optical transfer characteristic has been measured with regard to all of the wavelengths/frequency bandwidth the measurements of which are required. At this time point, a signal indicating the number of monitor times (a monitor-times signal) supplied from the output-times counter 60 to the measurement/analysis/display part 90 is "1" (one time). Accordingly, the measurement/analysis/display part 90 judges that the optical transfer characteristics have not been measured with regard to all of the wavelengths/frequency bandwidth to be measured (NO), and hence does not apply a control signal to the variable wavelength light source control part 80. Therefore, the process proceeds to step SP9.

In step SP9, the variable wavelength light source control part 80 supplies, on the basis of a coincidence detection signal received from the voltage comparator 27, the next reference wavelength setting signals to both the light sources 10 and 20, thereby to set the wavelengths of the optical signals to be generated respectively from these light sources 10 and 20 to the next reference wavelength $\lambda_1$. As a result, the optical signals each having this reference wavelength $\lambda_1$ are generated from both the light sources. At the same time, a data read instruction is supplied to the memory 25 to read out a wavelength switching data corresponding to the reference wavelength $\lambda_1$ from the memory 25, and the read-out wavelength switching data is supplied to the DAC 26.

After this, the aforementioned steps SP2, SP3, SP4 and SP5 are repeated to measure the optical transfer characteristic of the optical device under measurement DUT at each of the measurement points spaced a constant distance (or interval) apart starting at the set reference wavelength $\lambda_1$ (at each of the optical frequencies), the constant distance being determined by the resolution of the measuring apparatus.

Again, in the step SP4, when a decision is rendered that the amount of sweep of the optical frequency has reached the limit of the ending side of sweep (YES), the process proceeds to the aforesaid step SP6 in which the sweep of the optical frequency of the optical signal having the reference wavelength $\lambda_1$ generated from the variable wavelength sweep type measurement light source 10 has been ended. On the other hand, the voltage comparator 27 outputs a coincidence detection signal which is supplied to both the variable wavelength light source control part 80 and the output-times counter 60.

Next, in step SP8, a decision is rendered whether or not the optical transfer characteristic has been measured with regard to all of the wavelengths/frequency bandwidth the measurements of which are required. At this time point, a monitor-times signal supplied from the output-times counter 60 to the measurement/analysis/display part 90 is "2" (two times). Accordingly, the measurement/analysis/display part 90 judges that the optical transfer characteristics have not been measured with regard to all of the wavelengths/ frequency bandwidth to be measured (NO), and hence does not apply a control signal to the variable wavelength light source control part 80. Therefore, the process proceeds to the step SP9.

In the step SP9, the variable wavelength light source control part 80 supplies, on the basis of a coincidence detection signal received from the voltage comparator 27, the next reference wavelength setting signals to both the light sources 10 and 20, thereby to set the wavelengths of the optical signals to be generated respectively from these light sources 10 and 20 to the next reference wavelength $\lambda_2$. As a result, the optical signals each having this reference wavelength $\lambda_2$ are generated from both the light sources. At the same time, a data read instruction is supplied to the memory 25 to read out a wavelength switching data corresponding to the reference wavelength $\lambda_2$ from the memory 25, and the read-out wavelength switching data is supplied to the DAC 26.

Thereafter, the operations of the aforesaid steps SP9, SP2, SP3, SP4, SP5, SP6 and SP8 are repeated until a monitor-times signal supplied from the output-times counter 60 to the measurement/analysis/display part 90 becomes "n+1" (n+1 times).

When the monitor-times signal supplied from the output-times counter 60 to the measurement/analysis/display part 90 becomes "n+1", the measurement/analysis/display part 90 judges that the optical transfer characteristics have been measured with regard to all of the wavelengths/frequency bandwidth to be measured (YES), and hence applies a control signal to the variable wavelength light source control part 80. The variable wavelength light source control part 80 stops, upon receiving this control signal, supplying of the wavelength setting signals to both the light sources 10 and 20 as well as stops the operations of both the light sources 10 and 20. Thus, the real measurement of an optical transfer characteristic has been completed. When the real measurement has been completed, the process proceeds from the step SP8 to step SP10.

In this step SP10, the measurement/analysis/display part 90 concatenates the measured data of n+1 times for the optical transfer characteristic (the measured data at each of the measurement points in the range starting from a wavelength somewhat shorter than the minimum set reference wavelength $\lambda_0$ through the maximum set wavelength $\lambda_n$ to a wavelength corresponding to the limit of the sweep frequency), thereby to analyze the optical transfer characteristic of the optical device under measurement DUT in the desired wide optical frequency band (optical wavelength band). As the measured optical transfer characteristics of the optical device under measurement DUT, there may be listed characteristics of, for example, amplitude, dispersion, delay, phase, gain and the like at each measuring point. The measurement/analysis/display part 90 displays or outputs the results of the measurement/analysis, if necessary. By this process, the measurement regarding one specified optical transfer characteristic of the optical device has been completed.

Figure 3B:
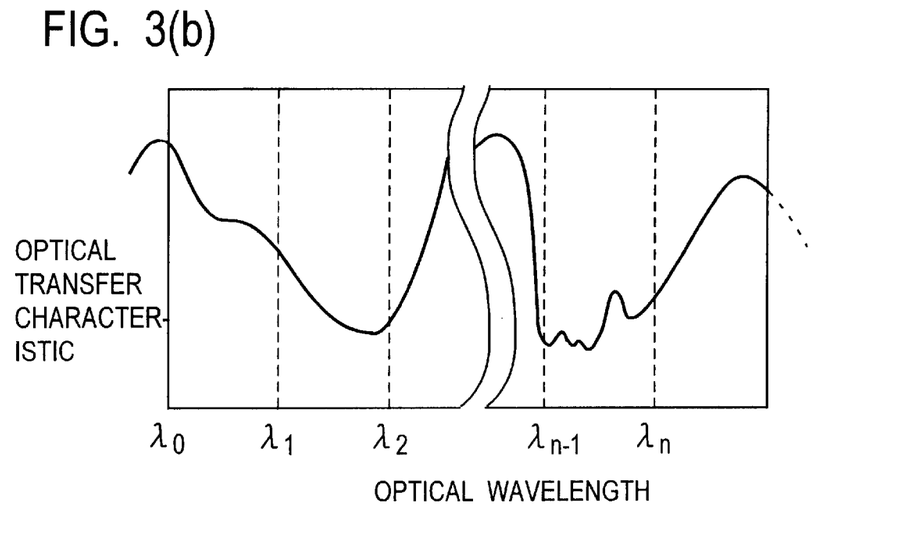
FIG. 3(b) shows an example of the waveform produced by concatenating the measured data of n+1 times for the optical transfer characteristic.

FIG. 3(b) shows an example of the waveform produced by concatenating the measured data of n+1 times for the optical transfer characteristic. As illustrated, by concatenating the measured data of n+1 times, the optical transfer characteristic of the optical device can be shown on optical wavelength axis or on optical frequency axis as a continuous waveform starting at a wavelength somewhat shorter than the minimum set reference wavelength $\lambda_0$, and extending therefrom through the maximum set reference wavelength $\lambda_n$ to a wavelength corresponding to the ending side limit of the sweep frequency (having a frequency range corresponding to these wavelengths). As already described, in this embodiment, each of the sweep frequency bandwidths is set such that the sweep of the frequency is started at a wavelength somewhat shorter than the corresponding one of the set reference wavelengths ($\lambda_0, \lambda_1, \lambda_2, \ldots \lambda_{(n-1)}, \lambda_n$), and that by one sweep of the frequency, the wavelength of the optical signal is changed from this somewhat shorter wavelength through the corresponding set reference wavelength until the next reference wavelength. Accordingly, in each of the second and the subsequent measurements, the frequency sweep is executed such that a predetermined band in the starting side of the sweep frequency band is overlapped with a predetermined band in the ending side of the preceding sweep frequency band. As a result, in the waveform in which the respective measured data are concatenated, as shown in FIG. 3(b), any discontinuous portion does not occur at all at any concatenated point between two adjacent sweep frequency bands. As a result, any optical transfer characteristic can be measured in desired wider optical frequency band with high resolution. Moreover, a highly reliable analysis can be executed.

Further, the distance between two adjacent reference wavelengths may be chosen such that it is substantially equal to a wavelength distance corresponding to the sweep frequency bandwidth (the bandwidth of several 10 GHz or so) of the optical signal generated from the variable wavelength sweep type measurement light source 10. In this case, when the measured data of plural times are concatenated, it is a possibility that a very minute discontinuous portion may occur between two adjacent measured data. However, there occurs no very minute discontinuous portion by which a serious degradation in reliability may be brought. Accordingly, in this case, an optical transfer characteristic can also be measured on optical wavelength axis or on optical frequency axis and in desired wider optical frequency band with high resolution.

In general, there is a possibility that the accuracy of optical frequency in sweep is lowered in case of sweeping over a wide optical frequency range due to that linearity of optical frequency in sweep may be sufficiently obtained. However, in the optical transfer characteristic measuring apparatus and method according to the present invention, a frequency sweep in narrow frequency range is repeated. Accordingly, linearity of optical frequency in each sweep is sufficiently obtained.

Consequently, when these measured data are concatenated, the accuracy of optical frequency in sweep is not lowered at all over the wide optical frequency range. Therefore, an accurate measurement of optical transfer characteristic can be ensured.

In addition, in case that the measured data are differentiated, and computed/analyzed to obtain a dispersion characteristic or the like in optical wavelength (optical frequency) region, the operation is performed by properly determining a wavelength width (frequency bandwidth) used in one operation. However, if the optical wavelength width (optical frequency bandwidth) of the measured data is equal to the distance between two adjacent reference wavelengths (optical frequency bandwidth), the operation data become discontinuous at the starting end and the ending end of this optical wavelength width. Accordingly, there is a possibility that an operation process error occurs at any one of or both of the starting end and the ending end of this optical wavelength width. However, according to the aforesaid embodiment, the actual sweep frequency width has been made somewhat larger than the distance between two adjacent reference wavelengths (optical frequency bandwidth). Therefore, the above operation process error can be prevented from occurring.

As is apparent from the foregoing description, according to the present invention, in case of measuring an optical transfer characteristic of an optical device under measurement, a plurality of sweeps of the optical frequency are performed by shifting an optical frequency band in the sequential order, and after the measurement has been completed, the plurality of the measured data are concatenated on optical frequency axis. As a result, each of the measurements can be performed with high resolution, and an optical transfer characteristic can be measured and analyzed in a wider frequency bandwidth. A specific example will be described. If the sweep of a narrow optical frequency band such as 50 GHz or so is performed in each of the measurements, and five measurements in total, for instance, are carried out, a measured result in wide optical frequency band of 200 to 250 GHz or so can be obtained by concatenating these measured high resolution data. In addition, since the resolution of the measured result in the wide optical frequency band is high, there is obtained a remarkable advantage that an optical transfer characteristic of an optical device can be measured and analyzed with high reliability. Accordingly, the present invention can also be applied with high reliability to an optical device under measurement which is used in optical communications and is desired to be measured and evaluated on optical frequency axis (optical wavelength axis) and in a wide optical frequency bandwidth with high resolution. Moreover, in wavelength division multiplexing transmission technology in recent years, there is a tendency that a distance between wavelengths becomes narrow more and more. Therefore, the resolution on optical frequency axis must sufficiently be ensured. However, the present invention can sufficiently cope with such requirements.

While the present invention has been described with regard to the preferred embodiments shown by way of example, it will be apparent to those skilled in the art that various modifications, alterations, changes, and/or minor improvements of the embodiments described above can be made without departing from the spirit and the scope of the present invention. Accordingly, it should be understood that the present invention is not limited to the embodiments shown and described above, and is intended to encompass all such modifications, alterations, changes, and/or minor improvements falling within the scope of the invention defined by the appended claims.

What is claimed is:

1. A method of measuring an optical transfer characteristic comprising the steps of:
   (A) generating an optical signal having a specified first wavelength from a variable wavelength sweep type light source which is capable of switching stepwise the wavelength of an optical signal generated thereby and sweeping the optical frequency of the optical signal in a predetermined frequency range;
   (B) measuring an optical transfer characteristic of an optical device under measurement at the specified first wavelength;
   (C) sweeping the optical frequency of the optical signal having the specified first wavelength;
   (D) measuring the optical transfer characteristic of the optical device under measurement at each of the respective wavelengths corresponding to a predetermined plurality of optical frequencies during the sweep of the optical frequency of the optical signal;
   (E) ending the sweep of the optical frequency of the optical signal when the sweep optical frequency of the optical signal has reached a frequency corresponding to a specified second wavelength to be generated next time from said variable wavelength sweep type light source;
   (F) measuring the optical transfer characteristic of the optical device under measurement at the specified second wavelength to be generated next time;
   (G) sweeping the optical frequency of the optical signal having the specified second wavelength;
   (H) measuring the optical transfer characteristic of the optical device under measurement at each of the respective wavelengths corresponding to a predetermined plurality of optical frequencies during the sweep of the optical frequency of the optical signal;
   (I) ending the sweep of the optical frequency of the optical signal when the sweep optical frequency of the optical signal has reached a frequency corresponding to a specified third wavelength to be generated next time from said variable wavelength sweep type light source;
   (J) repeating the steps (F) to (I) with regard to each of specified wavelengths to be generated from the variable wavelength sweep type light source until the specified wavelengths to be generated therefrom have been completed; and
   (K) concatenating, on optical frequency axis or optical wavelength axis, the measured results of the optical transfer characteristic regarding all of the specified wavelengths generated from the variable wavelength sweep type light source.

2. The method as set forth in claim 1, wherein a distance between the plurality of specified wavelengths generated from said variable wavelength sweep type light source and switched stepwise is chosen such that it is shorter than a distance corresponding to the sweep frequency bandwidth of the optical signal.

3. The method as set forth in claim 2, wherein by sweep of the optical frequency of the optical signal, a wavelength range is swept, which starts at a predetermined wavelength in the side of a specified wavelength generated earlier in time than the associated specified wavelength, and extends therefrom through this associated specified wavelength to a specified wavelength generated next time.

4. The method as set forth in claim 2, wherein by sweep of the optical frequency of the optical signal, a wavelength range is swept, which starts at the associated specified wavelength, and extends therefrom through a specified wavelength generated next time to a predetermined wavelength beyond this next generated specified wavelength.

5. The method as set forth in claim 2, wherein by sweep of the optical frequency of the optical signal, a wavelength range is swept, which starts at a predetermined wavelength in the side of a specified wavelength generated earlier in time than the associated specified wavelength, and extends therefrom through this associated specified wavelength and a specified wavelength generated next time to a predetermined wavelength beyond this next generated specified wavelength.

6. The method as set forth in claim 1, wherein the amount of sweep of the optical frequency of the optical signal is monitored by an optical heterodyne detection of an optical signal generated from the variable wavelength sweep type light source.

7. An apparatus for measuring an optical transfer characteristic comprising:
  a variable wavelength sweep type light source capable of switching stepwise the wavelength of an optical signal generated thereby and sweeping the optical frequency of the optical signal in a predetermined frequency range;
  light source control means for setting the wavelength of an optical signal generated from said variable wavelength sweep type light source to a specified wavelength as well as causing a sweep of the optical frequency of the generated optical signal having the specified wavelength over said predetermined frequency range to be carried out;
  first optical coupling means for inputting the optical signal generated from the variable wavelength sweep type light source into an optical device under measurement;
  measuring means optically coupled to said optical device under measurement for receiving an optical signal outputted from the optical device under measurement to measure an optical transfer characteristic of the optical device under measurement;
  counting means for counting the number of occurrence times of optical signals generated from the variable wavelength sweep type light source, the wavelength of each of said optical signals having been set to a specified wavelength; and
  means for ending the measurement of the optical transfer characteristic of the optical device under measurement, in response to a count signal outputted from said counting means when the number of occurrence times of optical signals each having a set specified wavelength has reached a preset number of times; and wherein
    said light source control means causing the variable wavelength sweep type light source to generate optical signals having their wavelengths sequentially switched and set to corresponding specified wavelengths as well as causing a sweep of the optical frequency of each of the generated optical signals having the corresponding specified wavelengths over said predetermined frequency range to be carried out, until the number of occurrence times of the optical signals each having a set specified wavelength reaches the preset number of times; and
    said measuring means concatenating, on optical frequency axis or optical wavelength axis, the measured results of the optical transfer characteristic regarding all of the specified wavelengths after the measurement of the optical transfer characteristic has been completed, and analyzing/displaying it.

8. The optical transfer characteristic measuring apparatus as set forth in claim 7, further comprising:
  a variable wavelength reference light source capable of switching stepwise the wavelength of an optical signal generated thereby and incapable of sweeping the optical frequency of the optical signal;
  second optical coupling means into which are inputted an optical signal generated from said variable wavelength reference light source and an optical signal generated from said variable wavelength sweep type light source, and outputting an optical signal which has been optically heterodyned; and
  optical detecting means for detecting the optical signal outputted from said second optical coupling means to detect an electrical signal having an optical beat frequency; and wherein
    the wavelength of an optical signal generated from said variable wavelength reference light source is set to the same wavelength as the specified wavelength of an optical signal generated from the variable wavelength sweep type light source by the light source control means;
    said second optical coupling means optically heterodynes an optical signal of a specified wavelength generated from the variable wavelength reference light source and an optical signal the wavelength of which is varied by a sweep of the optical frequency thereof, generated from the variable wavelength sweep type light source, and inputs the heterodyned optical signal into said optical detecting means; and
    the amount of sweep of the optical frequency is monitored on the basis of the electrical signal having an optical beat frequency detected by said optical detecting means.

9. The optical transfer characteristic measuring apparatus as set forth in claim 8, wherein
  said second optical coupling means optically heterodynes the optical signal generated from the variable wavelength sweep type light source and optically branched by the first optical coupling means, and the optical signal generated from the variable wavelength reference light source, and inputs the heterodyned optical signal into the optical detecting means.

10. The optical transfer characteristic measuring apparatus as set forth in claim 8, further including:
  frequency-to-voltage converting means for converting a detected output from the optical detecting means into a voltage signal;
  a memory in which wavelength switching data are previously stored, the number of the wavelength switching data being equal to the number of specified wavelengths of optical signals generated from the variable wavelength sweep type light source, and the specified wavelengths being switched in one measurement; and
  voltage comparing means for comparing a voltage signal outputted from said frequency-to-voltage converting means with data read out of said memory; and wherein
    said counting means counts the number of occurrence times of optical signals generated from the variable wavelength sweep type light source, the wavelength of each of said optical signals having been set to a specified wavelength, by counting comparison result signals outputted from said voltage comparing means.

11. The optical transfer characteristic measuring apparatus as set forth in claim 8, further including:
  high frequency counting means for measuring the amount of sweep of the optical frequency on the basis of a detected output from the optical detecting means, and supplying the measured result to said measuring means.

12. The optical transfer characteristic measuring apparatus as set forth in claim 11, further including:
  frequency-to-voltage converting means for converting a detected output from the optical detecting means into a voltage signal;
  a memory in which wavelength switching data are previously stored, the number of the wavelength switching data being equal to the number of specified wavelengths of optical signals generated from the variable wavelength sweep type light source, and the specified wavelengths being switched in one measurement; and voltage comparing means for comparing a voltage signal outputted from said frequency-to-voltage converting means with data read out of said memory; and wherein said counting means counts the number of occurrence times of optical signals generated from the variable wavelength sweep type light source, the wavelength of each of said optical signals having been set to a specified wavelength, by counting comparison result signals outputted from said voltage comparing means.

* * * * *